(12) United States Patent
Huber

(10) Patent No.: US 10,277,419 B2
(45) Date of Patent: Apr. 30, 2019

(54) HYBRID NETWORK END SYSTEM DEVICE

(71) Applicant: Airbus Defence and Space GmbH, Taufkirchen (DE)

(72) Inventor: Ferdinand Huber, Ingolstadt (DE)

(73) Assignee: AIRBUS DEFENCE & SPACE GMBH, Taufkirchen (DE)

(*) Notice: Subject to any disclaimer, the term of this patent is extended or adjusted under 35 U.S.C. 154(b) by 9 days.

(21) Appl. No.: 15/601,771

(22) Filed: May 22, 2017

(65) Prior Publication Data

US 2017/0353329 A1 Dec. 7, 2017

(30) Foreign Application Priority Data

Jun. 1, 2016 (DE) .................. 10 2016 110 150

(51) Int. Cl.
| | |
|---|---|
| *B60P 3/00* | (2006.01) |
| *G06F 3/06* | (2006.01) |
| *H04L 12/46* | (2006.01) |
| *H04L 12/931* | (2013.01) |
| *H04L 12/947* | (2013.01) |

(52) U.S. Cl.
CPC ........ *H04L 12/4625* (2013.01); *G06F 3/0634* (2013.01); *H04L 49/25* (2013.01); *H04L 49/351* (2013.01); *H04L 49/60* (2013.01); *H04L 49/65* (2013.01); *B60P 3/00* (2013.01); *G06F 2206/1008* (2013.01)

(58) Field of Classification Search
None
See application file for complete search history.

(56) References Cited

U.S. PATENT DOCUMENTS

| | | | | |
|---|---|---|---|---|
| 2006/0110162 A1* | 5/2006 | Tian | ..................... | H04J 14/0204 398/83 |
| 2009/0092145 A1* | 4/2009 | Kondo | ................ | H04L 49/3054 370/422 |
| 2010/0195634 A1* | 8/2010 | Thompson | .......... | H04W 36/385 370/338 |
| 2011/0116508 A1 | 5/2011 | Kirrmann | | |
| 2012/0105637 A1* | 5/2012 | Yousefi | .................. | H04N 7/183 348/148 |
| 2013/0113278 A1* | 5/2013 | Karl | .................... | B61L 15/0036 307/9.1 |
| 2013/0336338 A1 | 12/2013 | Armbruster et al. | | |

FOREIGN PATENT DOCUMENTS

| | | |
|---|---|---|
| DE | 102009000759 B3 | 6/2010 |
| EP | 2148473 A1 | 1/2010 |
| EP | 2566111 A1 | 3/2013 |

OTHER PUBLICATIONS

The German Patent and Trade Mark Office, Office Action for German Patent Application No. 10 2016 110 150.8 dated Feb. 1, 2017.
Arinc Specification 664 P7-1, Aircraft Data Network, Part 7, Avionics Full-Duplex Switched Ethernet Network, published Sep. 23, 2009 by Aeronautical Radio, Inc., Annapolis, Maryland.
European Patent Office, Extended European Search Report for Application No. 17171968.5-1857 dated Oct. 12, 2017.

* cited by examiner

*Primary Examiner* — Chirag G Shah
*Assistant Examiner* — Srinivasa R Reddivalam
(74) *Attorney, Agent, or Firm* — Lorenz & Kopf LLP

(57) ABSTRACT

Provided is a hybrid network end system device for a network system with an end system unit and a switch. The switch here exhibits at least one first port of the switch and a second port of the switch for connection with the network system.

10 Claims, 11 Drawing Sheets

HYBRID NETWORK END SYSTEM DEVICE

CROSS-REFERENCE TO RELATED APPLICATION

This application claims the benefit of, and priority to, German patent application number DE 102016110150.8, filed on Jun. 1, 2016.

TECHNICAL FIELD

Embodiments of the present invention relate to the technical area of networks for communication between end systems, and in particular to a hybrid network end system device with an integrated switch for such a network.

BACKGROUND

For example, Avionics Full Duplex Switching Ethernet (AFDX) is used for communication between aircraft systems, which is a conventional designation for ARINC Standard 664. This standard describes a network and the accompanying protocol for communication between aircraft systems.

In such AFDX networks, AFDX end systems are connected in a star topology by means of switches in point-to-multipoint connections (P2MP). To ensure redundancy, the network is duplicated. The network system thus encompasses a first network and a second network, which are built independently of each other. The data of the network end system are here output via two ports of the network end system to the independent networks.

In addition, the protocols High Availability Seamless Redundancy (HRS) and Parallel Redundancy Protocol (PRP) are used to ensure redundancy, in particular in networks of industrial and power plant automation. The latter are described in the IEC 62439-e standard.

BRIEF SUMMARY

It may be desirable to provide an improved network end system.

Accordingly, a hybrid network end system device, a network system as well as a vehicle can be provided according to certain embodiments of the present invention.

Exemplary embodiments and other aspects are indicated by the subject matter of the independent claims and of the following description.

In one aspect, a hybrid network end system device for a network system encompasses an end system unit and a switch. The switch here comprises at least one first port of the switch and a second port of the switch for connection with the network system.

In one aspect, a network system for communication between end systems encompasses at least one, in particular at least two, hybrid network end system device(s) according to an aspect of the present invention.

In one aspect, a vehicle, in particular an airplane, encompasses at least one, in particular two, hybrid network end system device(s) according to an aspect of the present invention.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Additional exemplary embodiments of the present invention will be described below, drawing reference to the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The illustrations on the figures are schematic and not to scale. In the following description of FIGS. 1 to 11, the same reference number is used for identical or corresponding elements.

Figure 1:
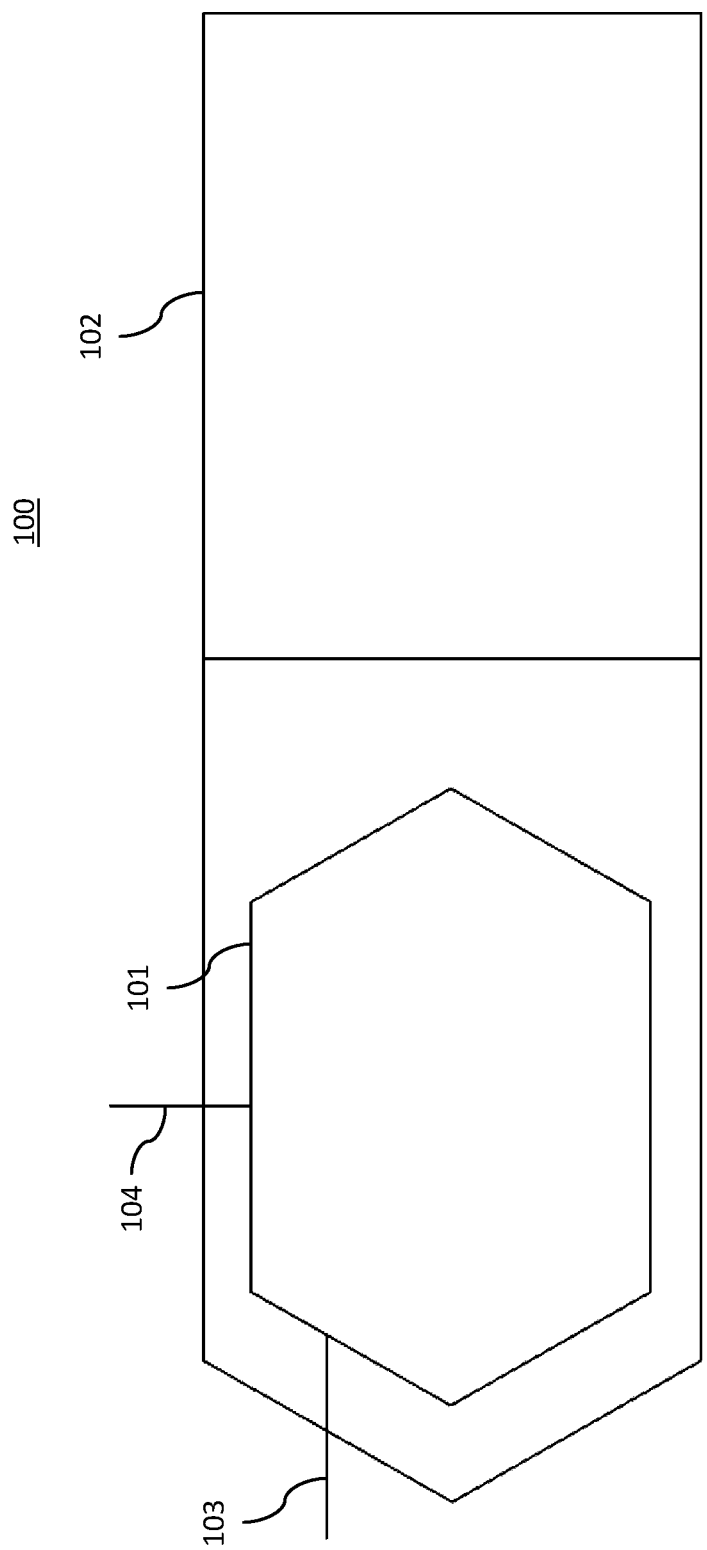
FIG. 1 shows a schematic view of an embodiment of the hybrid network end system device.

FIG. 1 shows a hybrid network end system device 100 according to a first exemplary embodiment. The hybrid network end system device 100 for a network here encompasses an end system unit 102 and a switch 101. As depicted, the switch 101 here exhibits at least one first port 103 of the switch and a second port 104 of the switch for connection with the network system.

Thus shown is an end system device that has a dual function, specifically functioning as an end system unit and as a switch. Given the twofold functionality as an end system unit of a network and simultaneously as a switch, the unit is referred to as a hybrid network end system device.

In contrast to the prior art described above, such hybrid network end system devices can be connected to each other even without interposing a separate switch by integrating a switch or a configurable, active network element into a unit, i.e., integrally, as an implementation with an end system. This enables a more flexible construction of the communication networks.

Figure 2:
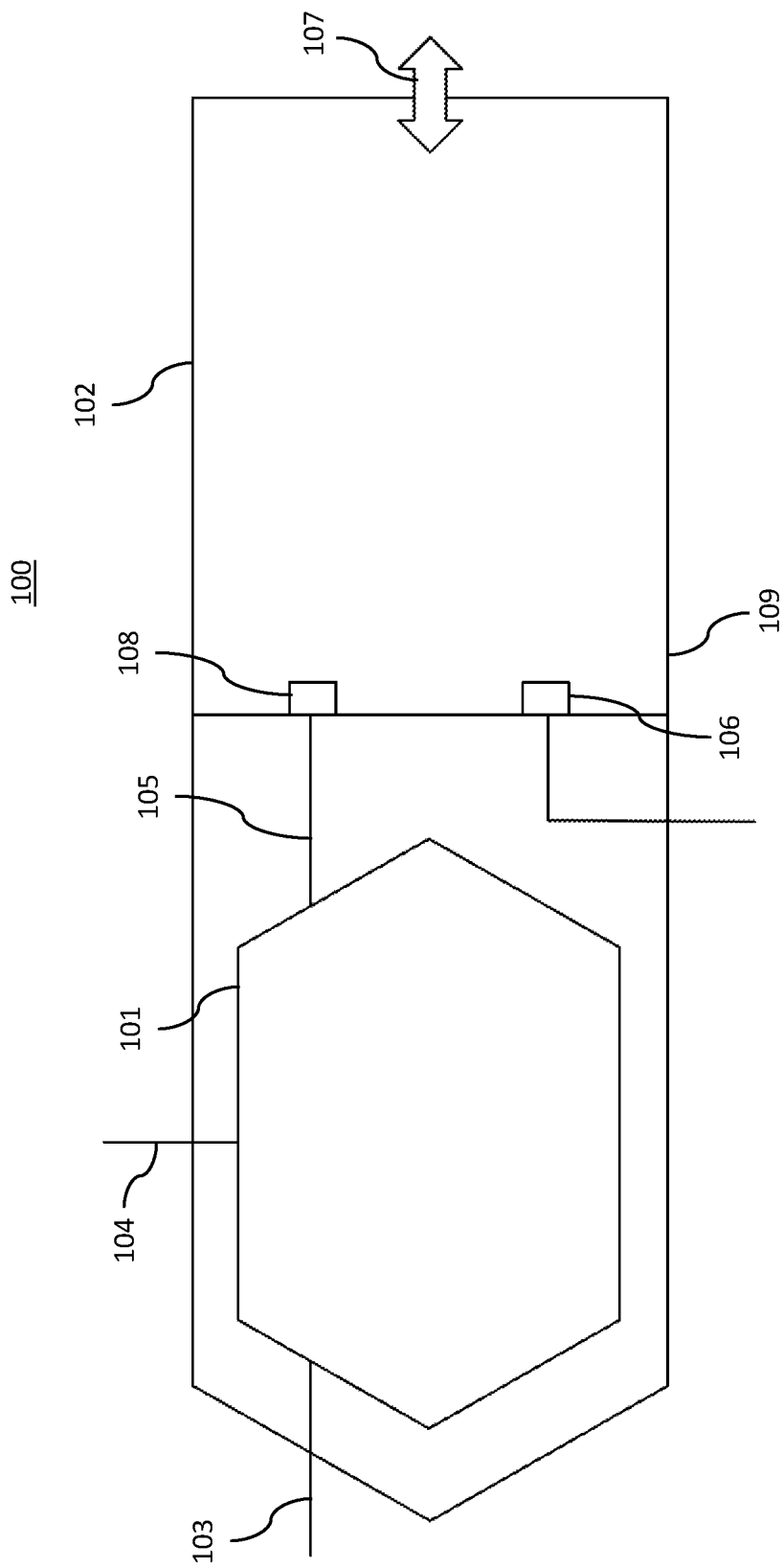
FIG. 2 shows another embodiment of the hybrid network end system device.

FIG. 2 shows a preferred embodiment of such a hybrid network end system device 100. As evident from FIG. 2, the hybrid network end system device 100 on FIG. 2 differs from the one on FIG. 1 by having another (third) port 105 of the switch, which is connected with the end system unit 102. To this end, the end system unit 102 has a first port 108 of the end system unit 102 for communication with the switch 101. The end system unit 102 further has a second port 106 of the end system unit 102 for communication with the network system. A local interface 107 of the end system unit 102 is used for connection with local components of the end system, and thus for local communication. For example, this local interface 107 can be designed as a CPU interface or host-CPU interface. As opposed to ports 103, 104 and 106, the local interface 107 is thus used for a local combination with local components, and not for combination with a network system.

The first 103 and second 104 port of the switch here preferably is used for communication with a first network of the network system, and the second port 106 of the end system device is used for communication with a second network of the network system, and is configured accordingly. As a consequence, the hybrid network end system device 100 can be used for communication in a network system with two independent networks, for example an AFDX network, wherein the switch 101 is here connected with a first network of the independent networks, and a connection is established with the second network via the second port 106 of the end system unit.

In another exemplary embodiment not shown on the figures, a second switch can be provided, which is connected with the second port 106 of the end system unit 102, and identical in design to the switch 101 described above and depicted on the figures. The statements thus apply accordingly. The second switch here is used for integration into the described second network of the network system.

Figure 3:
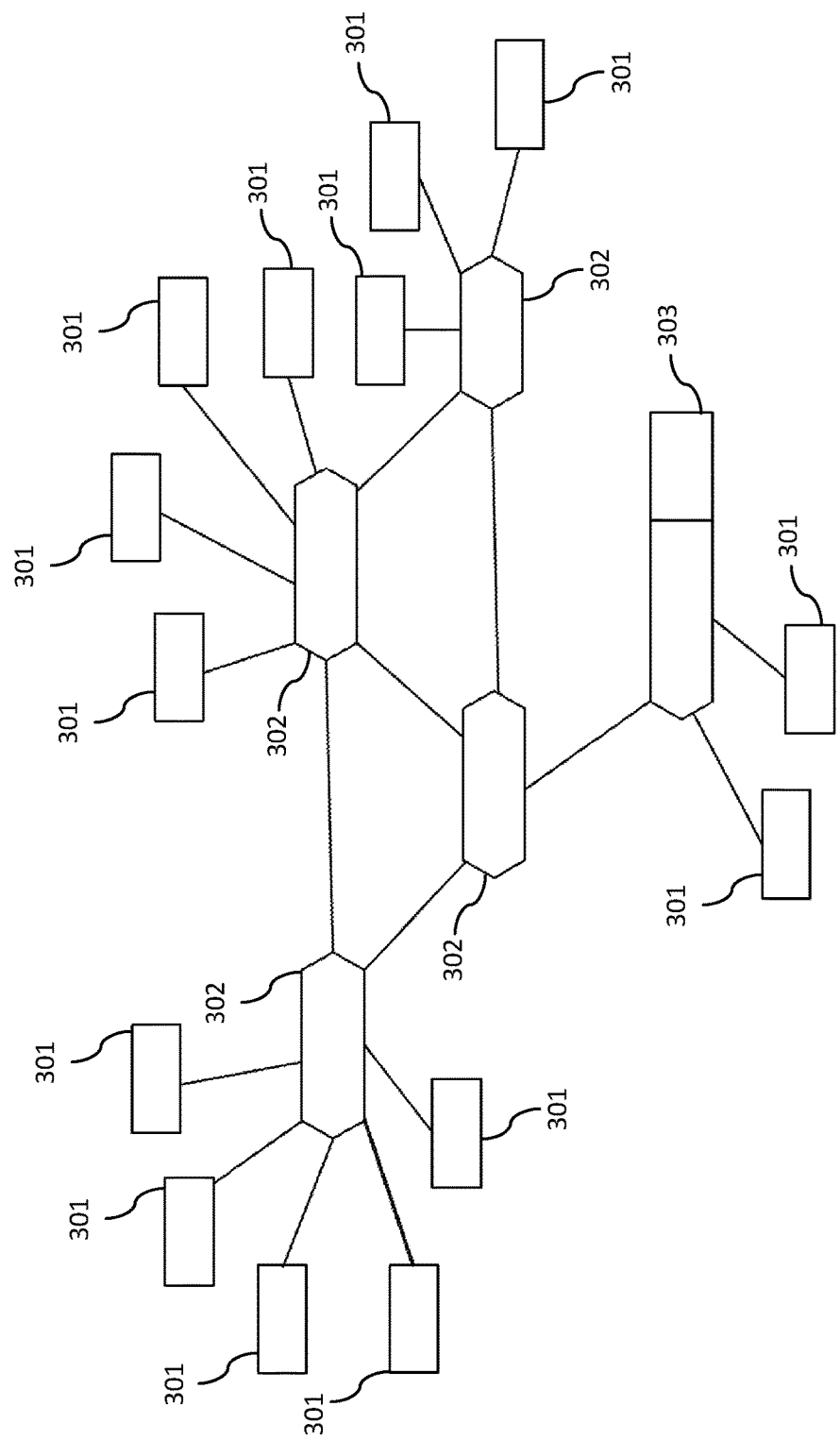
FIG. 3 shows a network system with a hybrid network end system device according to one of the embodiments.

FIG. 3 shows the use of such hybrid network end system devices 100 in a communication network or in a network system. Apart from conventional end systems 301 of the network system and conventional switches 302 of the network system, use is made of a hybrid network end system 303. As evident from the figure, the hybrid network end system 303 makes it possible to directly connect other end systems without the use of additional switches, thereby enabling a more flexible structure.

Figure 4:
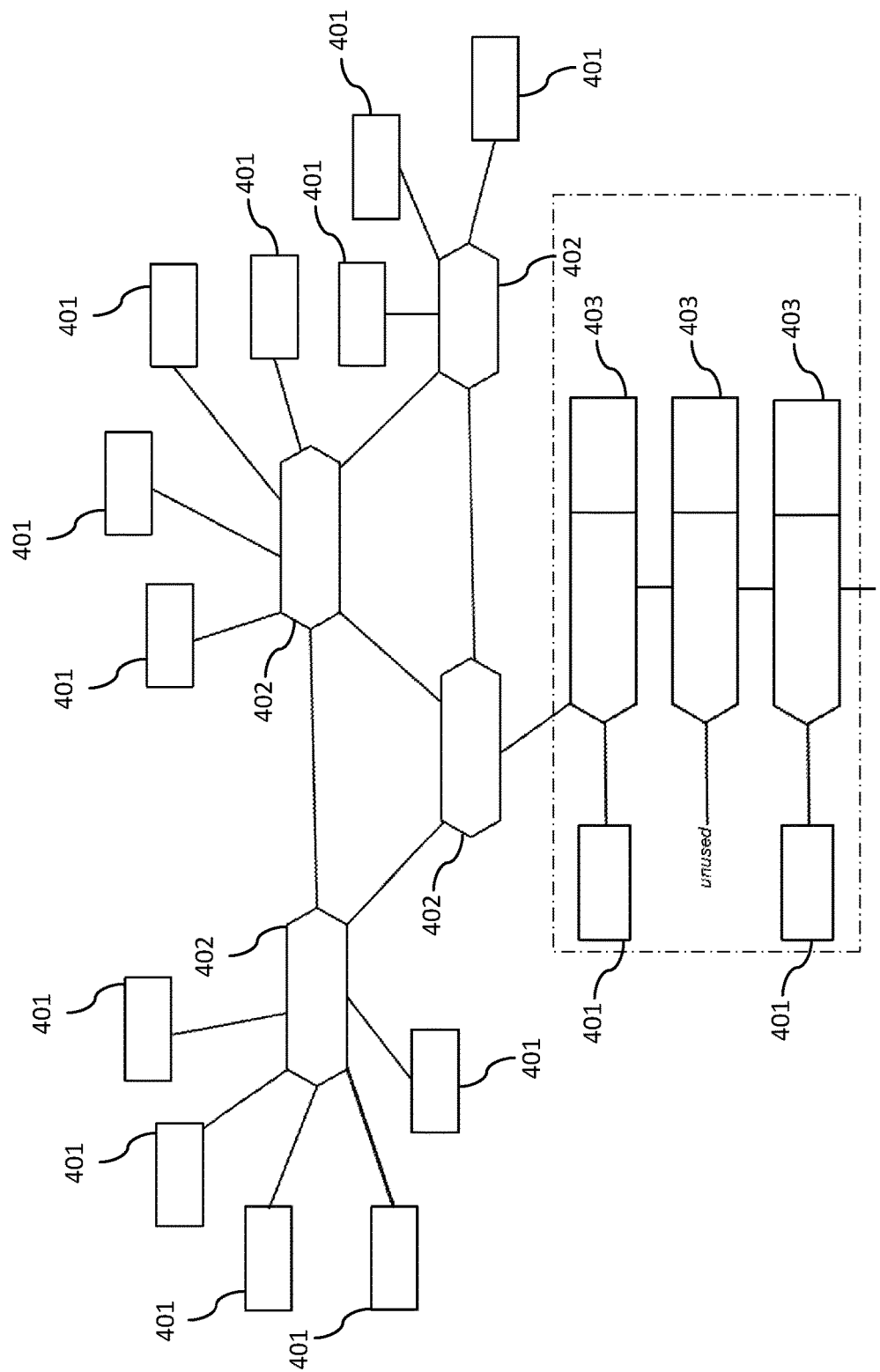
FIG. 4 shows another network system with several hybrid network end system devices according to one of the embodiments.

FIG. 4 shows another network system with the use of hybrid network end system devices. Several hybrid network end system devices 403 are shown in addition to the conventional end system devices 401 and conventional switches 402. In the present example, these are connected in series. This is generally also referred to as daisy chaining the hybrid network end system devices 403, since several hybrid network end system devices are connected in series one after the other. In the case of aircraft system cabling, for example in large or elongated areas like wings, the cabin, etc., this makes it possible to connect the hybrid network end system devices or other conventional end system devices at a reduced cabling outlay and with an elevated flexibility.

Figure 5:
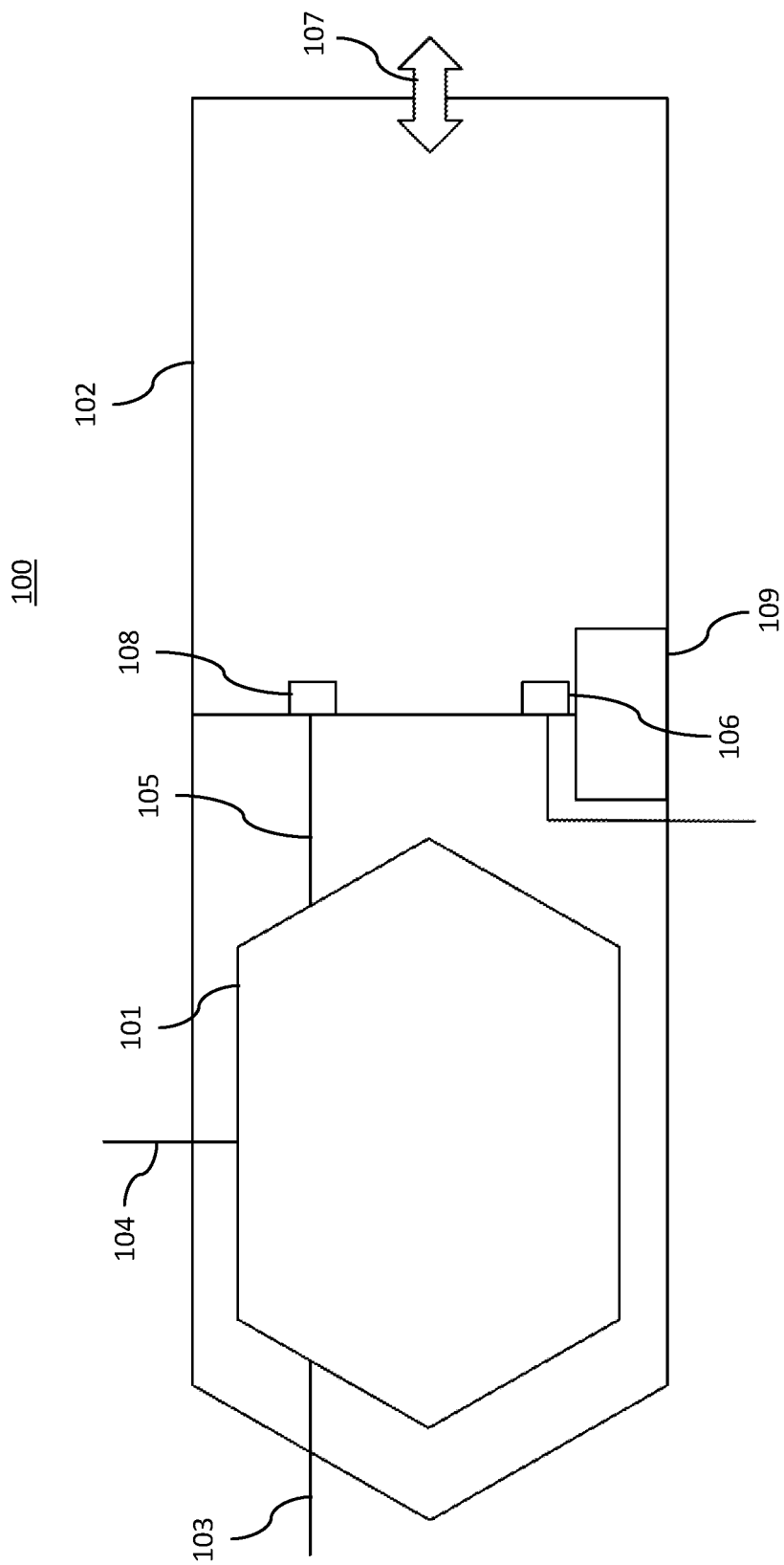
FIG. 5 shows another embodiment of a hybrid network end system device.

FIG. 5 shows another exemplary embodiment of a hybrid network end system device. In general, the latter differs in that a control device is provided in the hybrid network end system device.

According to the above description, the hybrid network end system device 100 comprises a switch 101 and an end system unit 102, as evident from FIG. 5. With regard to the first, second and third ports 103, 104 and 105 of the switch, let reference be made to the above description. The same holds true for the first and second ports of the end system unit and the local interface 106, 108 and 107.

The hybrid network end system device 100 on FIG. 5 further comprises a control unit 109. This control unit 109 is designed to switch the switch 101 into several modes.

If the switch 101 is switched into a first mode by the control unit 109, data or data packets arriving at the first port 103 of the switch, the second port 104 of the switch or the third 105 port of the switch are relayed either to the first port 103 of the switch, the second port 104 of the switch or the end system unit 102 via the third port 105 of the switch 101, or output to the respective other port after received at the respective port.

Figure 7:
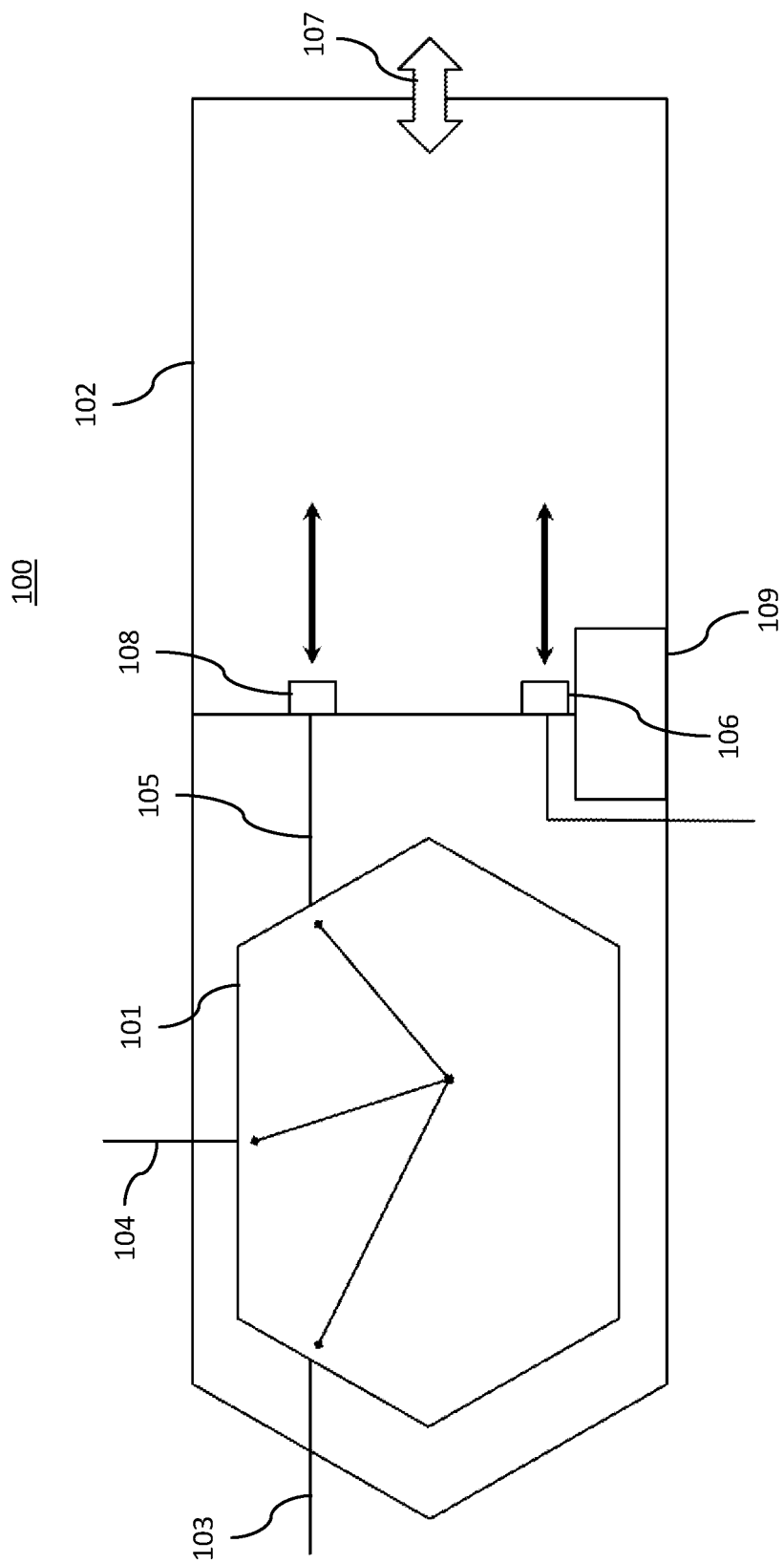
FIG. 7 shows a configuration of the hybrid network end system device in a first mode.

Such a controller is described on FIG. 7. As evident, the switch 101 is operated in a star topology corresponding to a conventional switch. Data or data packets received at the ports 103, 104, 105 of the switch are preferably relayed or routed according to their content to the respective responsible port. For example, if a packet 103 is received at the first port 103, the switch 101 checks for which port the data are intended, and outputs them to the respectively responsible port.

As also shown on the figure, the end system device 102 in this operating mode is set up to relay data received at the first port 108 for communication with the switch 101 or at the second port 106 for communication with the network system to the local interface 107. Accordingly, the data received at the local interface 107 are preferably output to both the first port 108 and to the second port 106 of the end system unit 102, so that, if the end system unit 102 is connected with a first network via the switch 101 and with a second network of two independent networks via the second port 106 of the end system unit 102, all data or data packets of the local interface 107 are disseminated via both networks or can be received from both networks.

The end system device 102 is here preferably designed in such a way that it relays the data or data packet received at the first port 108 or the second port 106 to the local interface 107 if no copy of the data or data packet was received at the end system device 102 chronologically prior to receiving the data or data packet. The determination of a copy can here take place using a sequential number or user data of the received data or received data packet, for example. For example, the end system device 102 can accordingly be set up to check whether data or a data packet with an identical sequential number or identical user data have already been received, and correspondingly implement the transfer or discard the received data or the received data packet if a copy of the data or data packet was received at the end system device 102 chronologically prior to receiving the data packet. Therefore, it is evident to the expert that not all data or data packets received at the first port 108 and the second port 106 must be relayed to the local interface.

Let it be noted that there exists the possibility of also connecting a switch with the second port 106 of the end system unit 102 that is similar to or identical to the switch 101 in design and used for communication with the second network of two independent networks of the network system.

The control unit 109 can further be designed to switch the switch 101 into a second mode. In this mode, the data or data packets received at the first port 103 of the switch 101 are relayed to the end system unit 102 via the third port 105 of the switch, and data received at the third port 105 of the switch are relayed to the first port 103. It is here preferred that, if the switch 101 is switched into the second mode, the end system device 102 be set up in such a way or the end system device 102 be controlled by the controller 109 in such a way that data received at the first port 108 of the end system unit 102 be relayed to the second port 106 of the end system unit 102, and data received at the second port 106 of the end system unit 102 be relayed to the first port 108.

Such a second mode will be described drawing reference to FIG. 8. As evident, a ring here arises between the first port 103 of the switch 101 and the second port 106 of the end system unit 102. Data or data packets received at the first port 130 of the switch 101 are thus annularly relayed via relaying to the third port 105 of the switch 101, receiving at the first port 108 of the end system device 102 and relaying to the second port 106 of the end system device 102.

This type of control, preferably by means of the control unit 109, makes it possible to operate the hybrid network end system device 100 in a ring mode, and thus integrate the latter into a network ring or into a ring topology using the first port 103 of the switch 101 and the second port 106 of the end system unit 102.

The end system unit 102 preferably determines whether the data are intended for it. If this is not the case, it outputs the data at its respective other port, and the data are disseminated further in the same direction in the annular network. If the data are intended for the end system device 102, i.e., if the end system device is the destination end system device of the data or data packet, it relays the latter to their local interface 107. Since the data are disseminated over the network in two directions, the destination end system device at a later point in time again reaches the same data or the same data packet at the other port of the destination end system device. The latter is then preferably discarded by the switching device. An end system device is here further preferably designed to check whether it has already relayed the data packet or a copy thereof. If this is the case, the switching device of the end system device is preferably designed to discard the data packet. Therefore, it is obvious to the expert that not all data or data packets received at the ports of the end system device 102 must be relayed to the respective other port.

Figure 8:
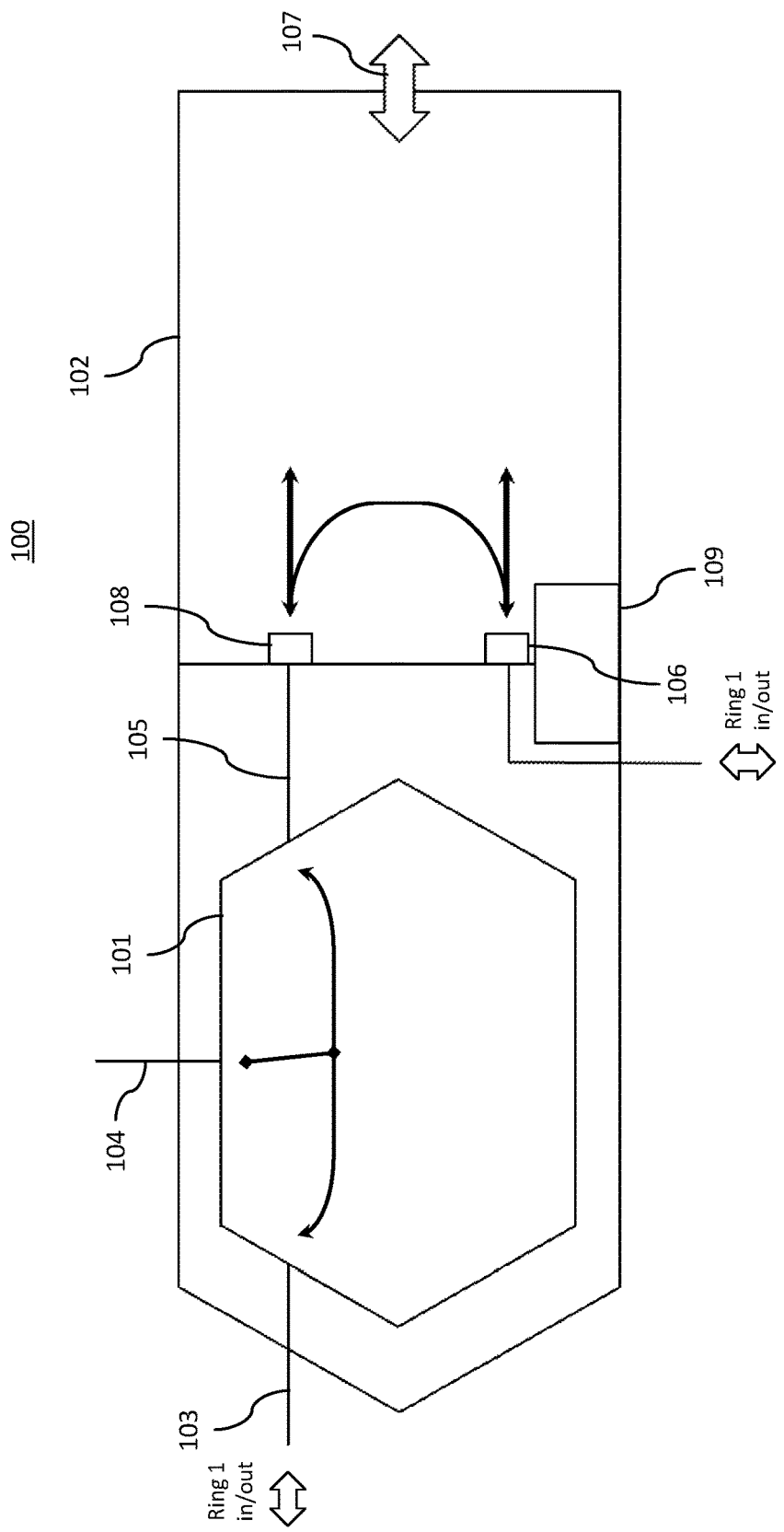
FIG. 8 shows a configuration of the hybrid network end system device in a second mode.

In addition, as also shown on FIG. 8, it is possible to implement a type of control where data or data packets received at the second port 104 of the switch 101 are further coupled into the ring comprised of the first port 103 of the switch 101 and the second port 106 of the end system device 102. Apart from the transfer described above, an indication is to this end preferably made at the second port 104 of the switch 101 inside of the switch 101 if the switch 101 determines that received data or a received data packet are/is intended for the second port 104. Alternatively, all data received at the first 103 or the third 105 port of the switch can also be output to the second port 104 of the switch 101. Accordingly, data or data packets received at the second port 104 of the switch are coupled into the ring network comprised of the first port 103 of the switch 101 and the second port 106 of the end system device 102 by outputting the data packets or data received at the second port 104 of the switch 101 to one or both ports 103 and 015 of the switch 101.

Figure 6:
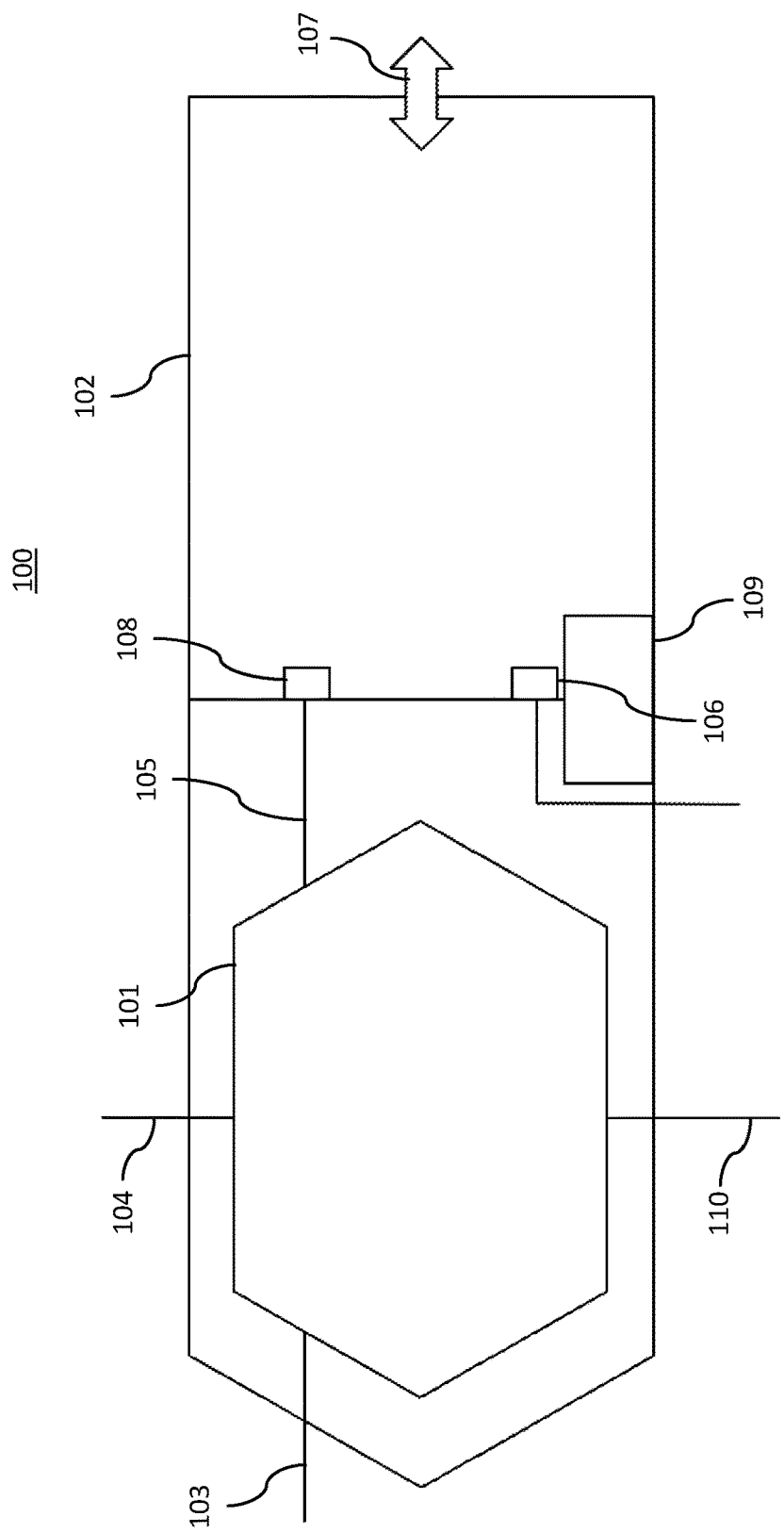
FIG. 6 shows another embodiment of the hybrid network end system device.

A third mode will now be described based on FIGS. 6 and 9. In another embodiment, the switch 101 of a hybrid network end system device 100 here comprises a fourth port 110 of the switch 101, as shown on FIG. 6.

The control unit 109 is here designed to switch the switch 101 into a third mode. In the third mode, the switch 101 is set up to output incoming data at the ports of the switch to the two outgoing ports of the switch of both rings. For example, data received at the first port 103 are multiplied or replicated and output to the second 104 port, i.e., to the corresponding outgoing port of the same ring, as well as to the fourth 110 port, i.e., to the corresponding outgoing port of the additional ring of the switch 101. In other words, the data at one port of each ring, i.e., in the present case two rings, are output to two ports serving as outgoing or output ports of the rings. This operation is also referred to as quad box operation.

If the control unit 109 has switched the switch into the third mode, it is preferred that the end system device 101 be set up or controlled by the control device 109 in such a way that data received at the first port 108 of the end system device 102 are relayed to the second port 106 of the end system unit 102, and data received at the second port 106 of the end system device 102 are relayed to the first port 108 of the end system unit 102. With respect to relaying in the end system device, in particular relaying to the local interface and to the respective other port, the above description applies accordingly to the second mode.

Figure 9:
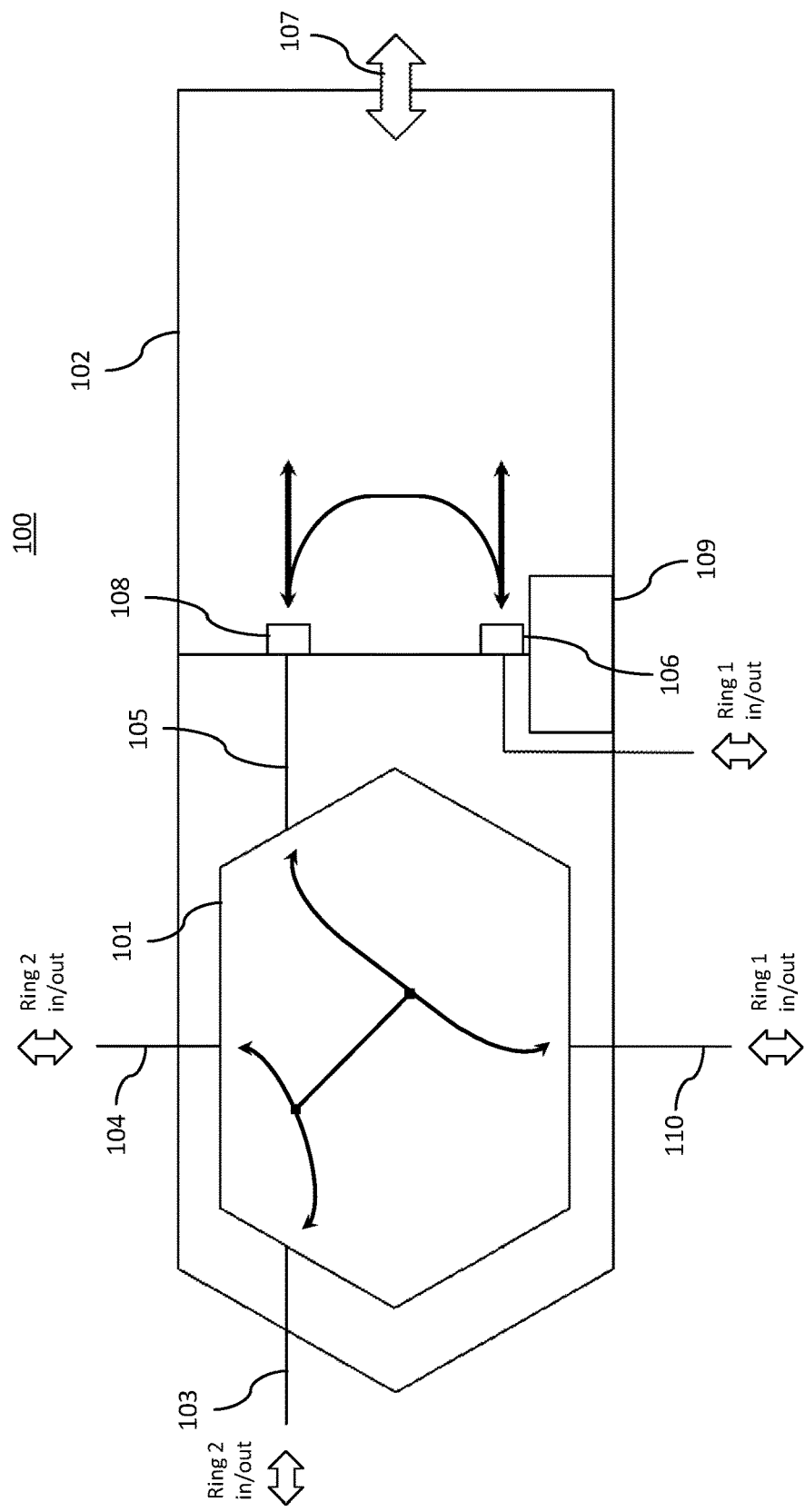
FIG. 9 shows the configuration of the hybrid network end system device in a third mode.

Such a configuration is shown on FIG. 9. As evident here, using the third mode, which can also be referred to as the quad box mode, permits the coupling of several ring networks. For example, on FIG. 9, the fourth port 110 of the switch and the third port 105 of the switch via the transfer of the end system unit 102 form a ring with the second port 106 of the end system unit 102, and the first 103 and second 104 port of the switch 101 form another (second) ring. Replicating or duplicating the packets with the quad box mode ensures a transmission of data between the individual rings, since data received at the first port 103 of the switch, for example, are transmitted both to the ring between the first port 103 of the switch and the second port 140 of the switch, and also output on the second ring via output to the fourth port 110 of the switch.

As a consequence, configuring the hybrid network end system device by means of the control device permits a diverse use in diverse topologies, which would not be economical to implement with conventional end systems utilizing separate switches. In addition, it becomes possible to build mixed ring and star topologies, wherein use can be made of the respective strengths of the topologies. For example, a ring topology can be used to minimize cabling, or a star topology can be used to enable a diverse cable routing.

Figure 10:
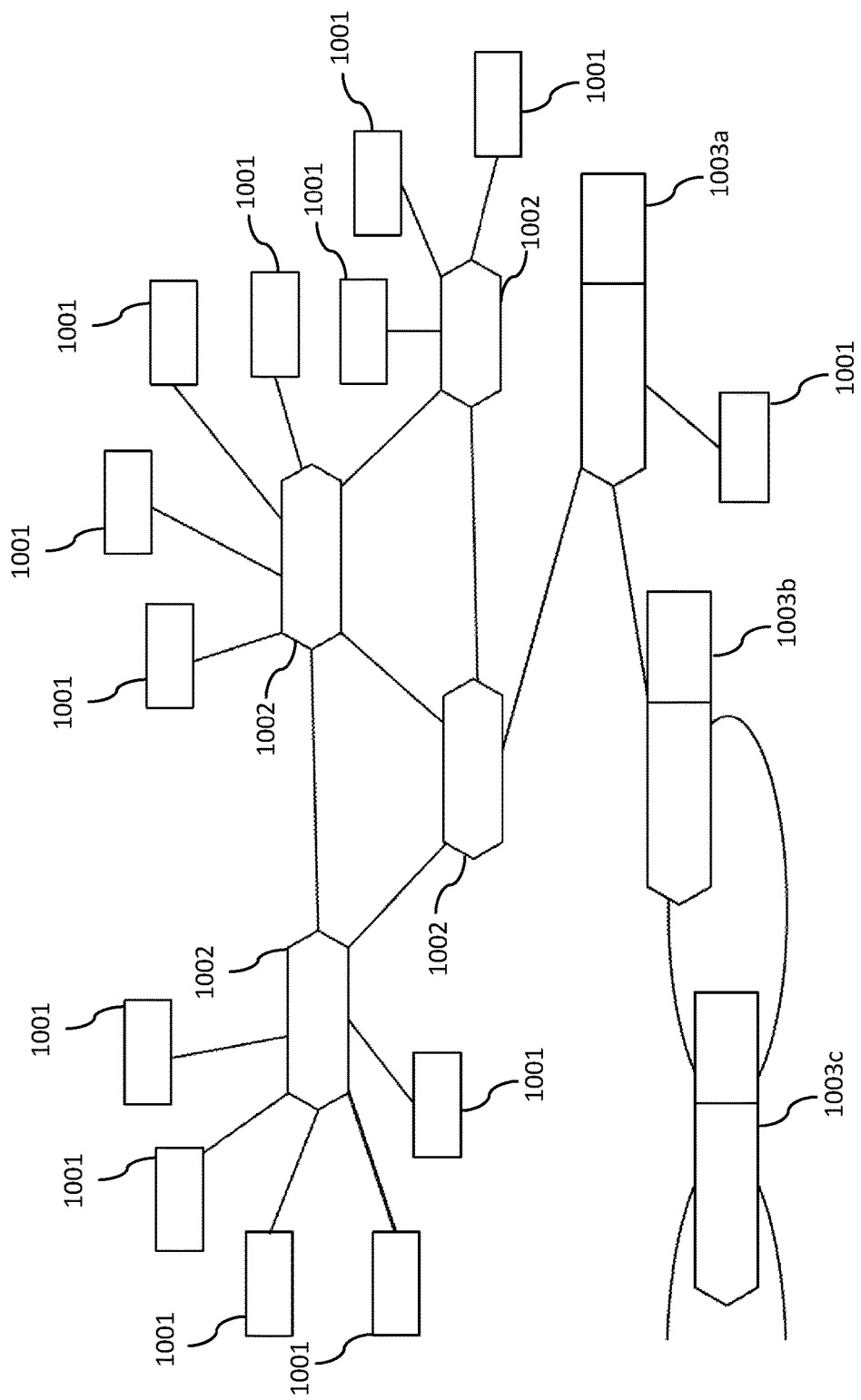
FIG. 10 shows a network system with several hybrid network end system devices in varying modes.
Figure 11:
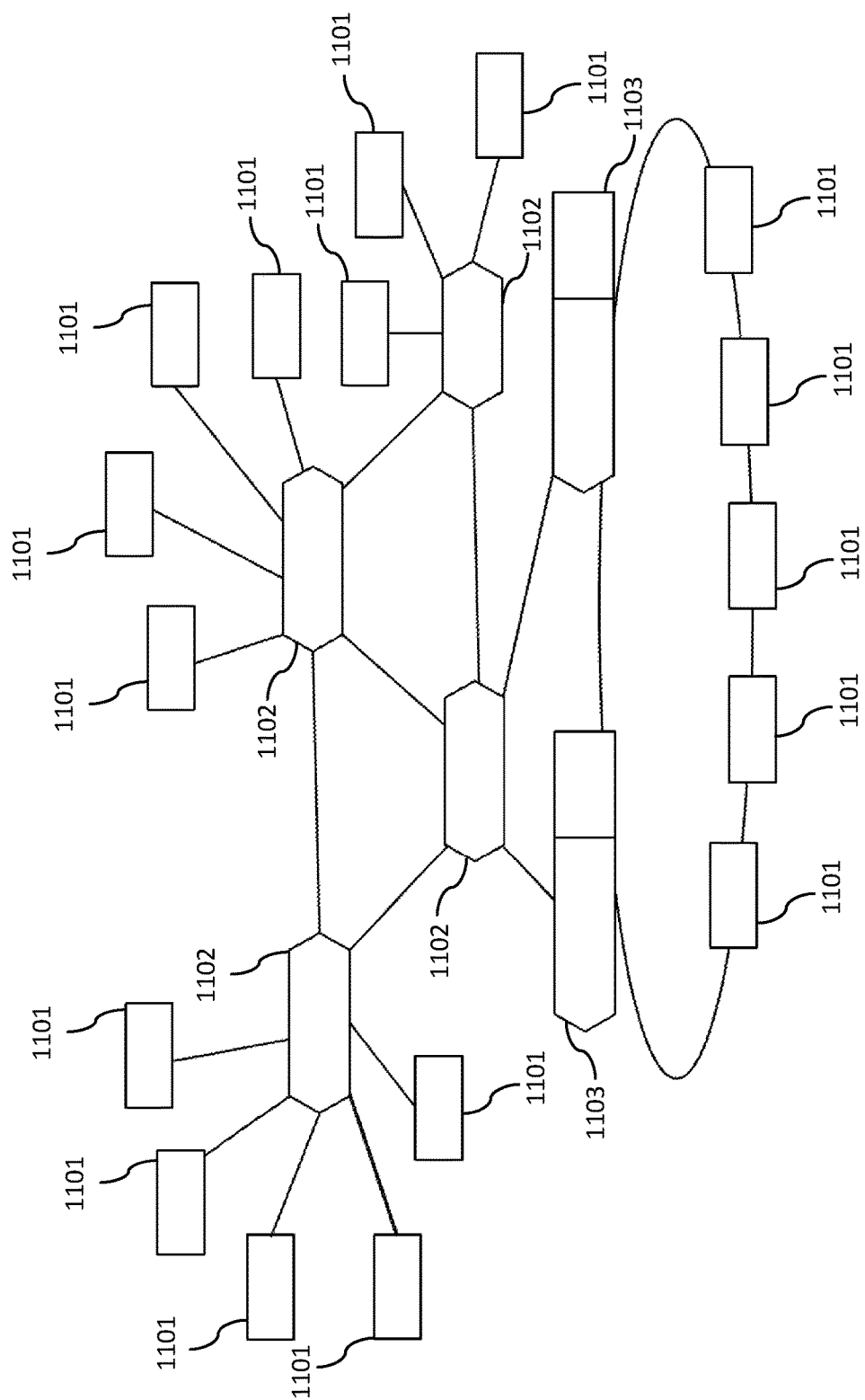
FIG. 11 shows the use of several hybrid network end system devices in the second mode.

FIGS. 10 and 11 show mixed ring and star topologies making use of the described hybrid network end system devices.

For example, several hybrid network end system devices 1003a, b and c are used on FIG. 10 apart from conventional end system devices 1001 and conventional switches 1002. The hybrid network end system device 1003a is here operated in the first mode, which can also be referred to as the star or star mode. Connected therewith is a hybrid network end system device 1003b, which is operated in the second mode, and can also be referred to as a mixed or mixed mode. In the present application, this hybrid network end system device 1003b serves as a connection between a ring network and the star network. In turn, a hybrid network end system device 1003c that operates in the third mode or quad box mode and connects two ring networks is in the present case connected with the ring network formed by the hybrid network end system device 1003b.

As evident, the described hybrid network end system devices offer a wide variety of options and great freedoms in optimally configuring a network for communication using all possible topologies.

FIG. 11 here shows another system, which apart from the conventional end system devices 1101 and the conventional switches 1102 comprises two hybrid network end system devices 1103, which each are operated in the mixed mode and each serve to couple a ring network into the star topology. Using two hybrid network end systems 1103 provides a redundant connection to the star network, which ensures a higher reliability by comparison to daisy chaining, for example, and thus enhances failure safety. At the same time, the cabling outlay in the ring network is minimized, which is optimal, for example, when cabling the wing of a cabin, etc.

Such a hybrid network end system device described above can preferably be designed for communication between aircraft systems, in particular airplane systems. In particular, a hybrid network end system device can preferably be designed for use in AFDX networks, and can be set up to support AFDX protocols.

However, such a hybrid network end system device described above can also be designed for use in an automobile (automobile end system) or in another vehicle (vehicle end system). This is advantageous in particular in vehicles where elevated requirements are placed on data transmission between end systems, such as sensors and control devices of a vehicle, owing to drive-by-wire, automated driving, etc. Autonomy along with driver assistance systems or Advanced Driver Assistance Systems (ADAS) are also to be mentioned here as keywords. Also provided are configurations for use in ships, industrial plants, etc.

The hybrid network end system device is preferably designed for deterministic network communication.

As known to the expert, end system devices or end systems are devices connected with a computer network that sit at the edge of the network. These end systems provide information and services. Expressed differently, end systems are devices whose applications access the network components, so as to transmit or receive data from the network, such as sensors, control devices, etc. In the case of AFDX, the end systems can be designed as AFDX end systems, which are part of an avionics or aircraft subsystem, which have to send data over the AFDX network, for example. Expressed differently, a subsystem, for example an avionics or aircraft subsystem, comprises an end system or an end system device as described above, which here is preferably designed as an AFDX end system device.

In another exemplary embodiment not shown on the figures, a second switch can be provided, which is connected with the second port 106 of the end system unit 102 and set up identically to the switch 101 described above and depicted on the figures. All statements thus apply accordingly. The second switch is here used for integration into the described second network of the network system.

Let it here be noted that the term "relay" is to be construed to mean that the data or at least the user data of a data packet are received at one point and output at another point. An adjustment of the data packet can here be provided, for example a change in the header or the like.

In addition, let it be noted that "comprising" and "having" do not rule out other elements or steps, and that "a" or "an" does not preclude a plurality. Let it further be noted that features or steps described with reference to one of the above exemplary embodiments can also be used in combination with other features or steps of other exemplary embodiments described above. Reference numbers in the claims are not to be regarded as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A hybrid network end system device for a network system, comprising:
    an end system unit functioning as an end system unit of a network;
    a switch integrated in the end system unit; and
    a control unit;
    wherein the end system unit comprises a first port of the end system for communication with the switch and a second port of the end system for communication with the network system;
    wherein said switch has at least one first port of the switch and a second port of the switch for connection with the network system, and a third port of the switch for connection with the first port of the end system unit;
    wherein the control unit is configured to switch the switch into a first mode or second mode;
    wherein in the first mode the switch relays data in a star topology between the ports of the switch;
    wherein in the second mode the switch relays data in a ring topology between a port of the switch and a port of the end system unit;
    wherein the end system unit comprises a local interface;
    wherein, in the first mode, the switch is configured to relay data received at the first port of the switch, the second port of the switch or the third port of the switch to either the first port of the switch, the second port of the switch or the end system unit via the third port of the switch; and
    wherein, in the second mode, the switch is configured to relay data received at the first port of the switch to the end system unit via the third port of the switch, and relay data received at the third port of the switch to the first port of the switch;
    wherein, if the control unit has switched the switch into the second mode, the end system unit is configured to relay data received at the first port of the end system unit to a second network via the second port of the end system unit, and relay data received at the second port of the end system unit to a first network via the first port of the end system unit; and
    wherein, if the control unit has switched the switch into the first mode, the end system unit is configured to relay data received at the first and second port of the end system unit to the local interface.

2. The hybrid network end system device according to claim 1, wherein the switch is configured to relay data received at the first port of the switch, the second port of the switch, or the end system unit to either the first port of the switch, the second port of the switch or the end system unit.

3. The hybrid network end system device according to claim 2, wherein the end system unit comprises a local interface.

4. The hybrid network end system device according to claim 3, wherein:
the first and second port of the switch is configured to be connected with a first network of the network system; and
the second port of the end system unit is configured to be connected with a second network of the network system.

5. The hybrid network end system device according to claim 1, wherein:
the switch further comprises a fourth port of the switch;
the control unit is configured to switch the switch into a third mode;
in the third mode, the switch is configured to output incoming data at one of the ports of the switch to two ports of the switch, which are configured as outgoing ports of the switch of two network rings.

6. The hybrid network end system device according to claim 5, wherein, if the control unit has switched the switch into the third mode, the end system unit is configured to relay the data received at the first port of the end system unit to the second port of the end system unit, and to relay data received at the second port of the end system unit to the first port of the end system unit.

7. The hybrid network end system device according to claim 1, wherein the hybrid network end system device is configured to support communication between vehicle end systems.

8. The hybrid network end system device according to claim 7, wherein the vehicle end systems are aircraft end systems.

9. A network system for communication between end systems, the network system comprising:
at least one hybrid network end system device, each hybrid network end system device comprising:
an end system unit functioning as an end system unit of a network;
a switch integrated in the end system unit; and
a control unit;
wherein the end system unit comprises a first port of the end system for communication with the switch and a second port of the end system for communication with the network system;
wherein the switch has at least one first port of the switch and a second port of the switch for connection with the network system, and a third port of the switch for connection with the first port of the end system unit;
wherein the control unit is configured to switch the switch into a first mode or second mode;
wherein in the first mode the switch relays data in a star topology between the ports of the switch;
wherein in the second mode the switch relays data in a ring topology between a port of the switch and a port of the end system unit;
wherein the end system unit comprises a local interface;
wherein, in the first mode, the switch is configured to relay data received at the first port of the switch, the second port of the switch or the third port of the switch to either the first port of the switch, the second port of the switch or the end system unit via the third port of the switch; and
wherein, in the second mode, the switch is configured to relay data received at the first port of the switch to the end system unit via the third port of the switch, and relay data received at the third port of the switch to the first port of the switch;
wherein, if the control unit has switched the switch into the second mode, the end system unit is configured to relay data received at the first port of the end system unit to a second network via the second port of the end system unit, and relay data received at the second port of the end system unit to a first network via the first port of the end system unit; and
wherein, if the control unit has switched the switch into the first mode, the end system unit is configured to relay data received at the first and second port of the end system unit to the local interface.

10. A vehicle comprising:
at least one hybrid network end system device, each hybrid network end system device comprising:
an end system unit functioning as an end system unit of a network;
a switch integrated in the end system unit; and
a control unit;
wherein the end system unit comprises a first port of the end system for communication with the switch and a second port of the end system for communication with the network system;
wherein the switch has at least one first port of the switch and a second port of the switch for connection with the network system, and a third port of the switch for connection with the first port of the end system unit;
wherein the control unit is configured to switch the switch into a first mode or second mode;
wherein in the first mode the switch relays data in a star topology between the ports of the switch;
wherein in the second mode the switch relays data in a ring topology between a port of the switch and a port of the end system unit;
wherein the end system unit comprises a local interface;
wherein, in the first mode, the switch is configured to relay data received at the first port of the switch, the second port of the switch or the third port of the switch to either the first port of the switch, the second port of the switch or the end system unit via the third port of the switch; and
wherein, in the second mode, the switch is configured to relay data received at the first port of the switch to the end system unit via the third port of the switch, and relay data received at the third port of the switch to the first port of the switch;
wherein, if the control unit has switched the switch into the second mode, the end system unit is configured to relay data received at the first port of the end system unit to a second network via the second port of the end system unit, and relay data received at the second port of the end system unit to a first network via the first port of the end system unit; and
wherein, if the control unit has switched the switch into the first mode, the end system unit is configured to relay data received at the first and second port of the end system unit to the local interface.

* * * * *